US007948561B2

(12) United States Patent
Yun et al.

(10) Patent No.: US 7,948,561 B2
(45) Date of Patent: May 24, 2011

(54) VIDEO PLAYBACK APPARATUS AND METHOD FOR CONTROLLING THE SAME

(75) Inventors: Jong Hee Yun, Suwon-si (KR); Kil Soo Jung, Hwaseong-Goon (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1308 days.

(21) Appl. No.: 11/507,549

(22) Filed: Aug. 22, 2006

(65) Prior Publication Data

US 2007/0189717 A1 Aug. 16, 2007

(30) Foreign Application Priority Data

Feb. 1, 2006 (KR) .................... 10-2006-0009723

(51) Int. Cl.
*H04N 5/45* (2006.01)
(52) U.S. Cl. ...................................................... 348/565
(58) Field of Classification Search .......... 348/561–568, 348/581
See application file for complete search history.

(56) References Cited

U.S. PATENT DOCUMENTS

| | | | | |
|---|---|---|---|---|
| 5,432,561 | A * | 7/1995 | Strubbe .......... | 348/565 |
| 2002/0034375 | A1 | 3/2002 | Suda | |
| 2002/0140861 | A1 | 10/2002 | Janevski et al. | |
| 2004/0263686 | A1 | 12/2004 | Kim | |
| 2005/0012862 | A1 | 1/2005 | Lee | |
| 2005/0018083 | A1* | 1/2005 | Ryou .......... | 348/565 |
| 2005/0285942 | A1 | 12/2005 | Lin et al. | |

FOREIGN PATENT DOCUMENTS

| | | |
|---|---|---|
| CN | 1578436 | 2/2005 |
| GB | 2 227 901 | 8/1990 |
| JP | 10-215409 | 8/1998 |
| JP | 2001-211422 | 8/2001 |
| JP | 2003-125365 | 4/2003 |
| JP | 2005-130083 | 5/2005 |
| JP | 2005-223690 | 8/2005 |
| KR | 1999-5754 | 1/1999 |
| KR | 10-504471 | 7/2005 |
| WO | WO 98/27724 | 6/1998 |

OTHER PUBLICATIONS

Japanese Office Action issued Oct. 6, 2009 in JP Application No. 2006-254694.
Office Action issued in corresponding Japanese Patent Application No. 2006-254694 dated May 19, 2009.
Office Action issued in Chinese Patent No. 2006101274926.
Korean Patent Abstract of Publication No. KR 2004-13765.
Search Report issued on Jul. 2, 2007 by the European Patent Office for European Application No. 06076703.5-2202.
Office Action issued Sep. 24, 2009 in corresponding Taiwanese Patent Application No. 095132833.

* cited by examiner

*Primary Examiner* — Michael Lee
(74) *Attorney, Agent, or Firm* — Stanzione & Kim, LLP

(57) ABSTRACT

The video playback apparatus includes: a video data processor for simultaneously and asynchronously reproducing a main-video stream and a sub-video stream, and controlling position- and size-information of a corresponding display window; and a video output controller, if one of the main- and sub-video streams reproduced by the video data processor is completely reproduced earlier than the other one, which controls the video data processor to enlarge a display window of the remaining video stream to an entire screen size.

27 Claims, 7 Drawing Sheets

CONVENTIONAL ART
FIG. 1A
CONVENTIONAL ART
FIG. 1B
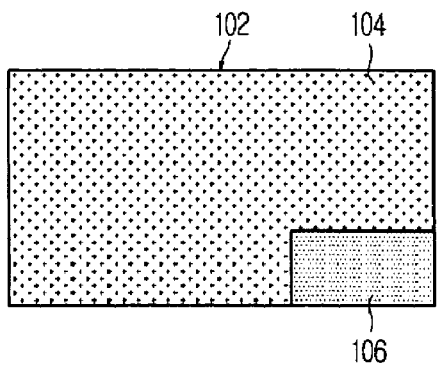
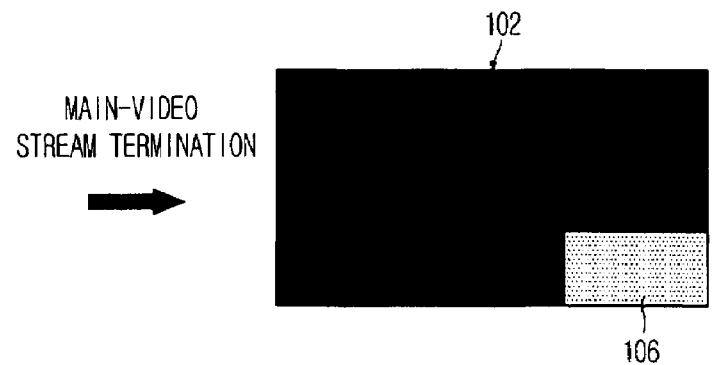
(A)
(B)

CONVENTIONAL ART
FIG. 2A
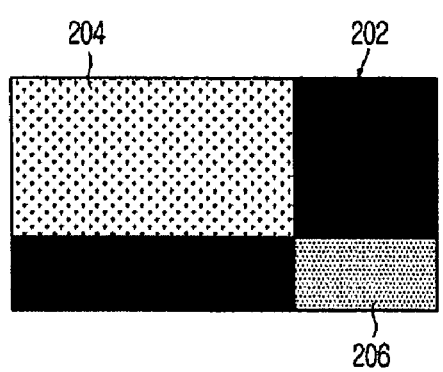
CONVENTIONAL ART
FIG. 2B
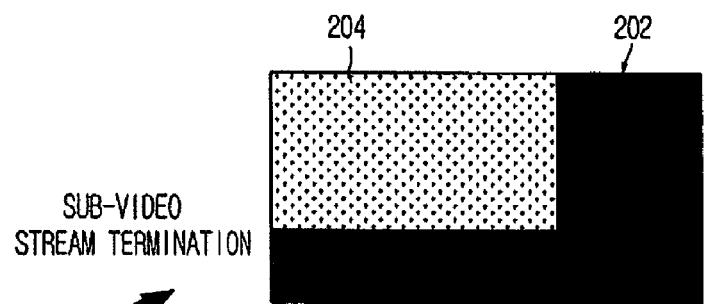
SUB-VIDEO STREAM TERMINATION
MAIN-VIDEO STREAM TERMINATION
FIG. 2C
CONVENTIONAL ART FIG. 5A
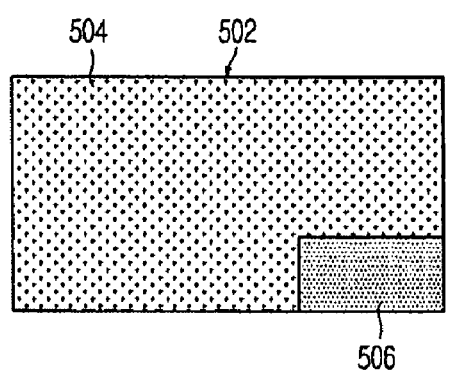
FIG. 5B
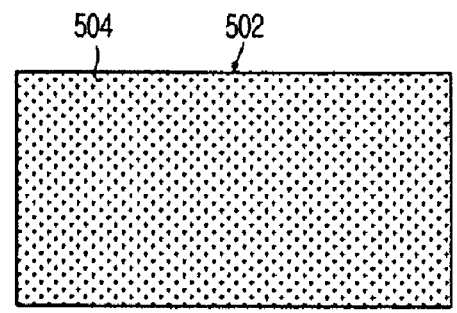
SUB-VIDEO
STREAM TERMINATION
MAIN-VIDEO
STREAM TERMINATION
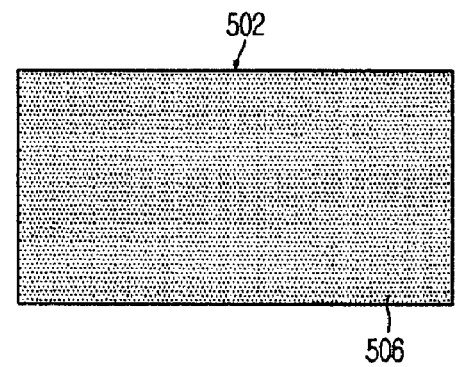
FIG. 5C FIG. 7A
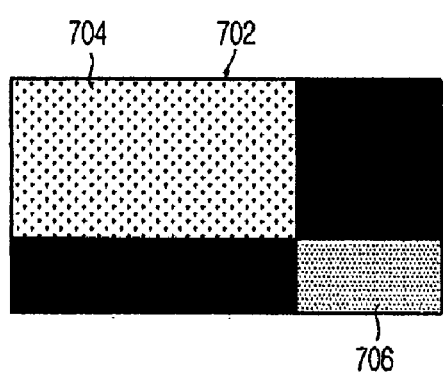
FIG. 7B
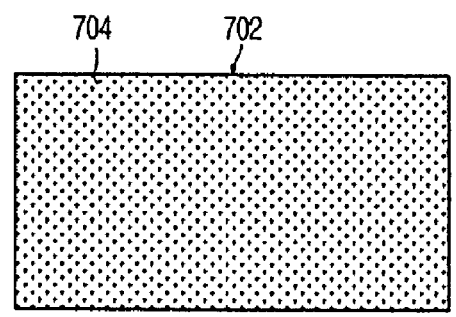
SUB-VIDEO
STREAM TERMINATION
MAIN-VIDEO
STREAM TERMINATION
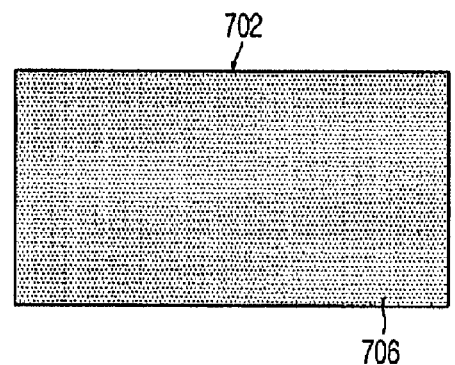
FIG. 7C

VIDEO PLAYBACK APPARATUS AND METHOD FOR CONTROLLING THE SAME

CROSS-REFERENCE TO RELATED APPLICATION

This application claims the benefit of Korean Application No. 2006-9723, filed Feb. 1, 2006 in the Korean Intellectual Property Office, the disclosure of which is incorporated herein by reference

BACKGROUND OF THE INVENTION

1. Field of the Invention

Aspects of the present invention relate to a video playback apparatus and a method for controlling the same, and more particularly to an apparatus and method for controlling individual display windows when displaying different video streams on a display via individual display windows.

2. Description of the Related Art

A Picture-In-Picture (PIP) mode and a Picture-Out-Picture (POP) mode have been widely used to simultaneously reproduce different video streams on an entire screen of a display, such that the individual video streams are displayed on individual display windows, respectively.

FIGS. 1A and 1B show characteristics of a conventional PIP-based display screen. FIGS. 2A, 2B, and 2C show characteristics of a conventional POP-based display screen.

The PIP mode shown in FIG. 1A sets an entire screen 102 to a main display window 104, displays an image of a main-video stream on the main display window 104, constructs a sub-display window 106 smaller than the main display window 104 in the main display window 104, and displays an image of a sub-video stream on the sub-display window 106.

In contrast, the POP mode shown in FIG. 2A constructs a main-display window 204 and a sub-display window 206 in an entire screen 202 of a display and displays different video stream images on individual display windows 204 and 206, respectively.

A television (TV) can allow a user to simultaneously view broadcast programs received via different broadcast channels using the PIP mode or the POP mode. For example, the user can view a specific show-program via the main-display window, and at the same time can view a sports game of another channel via the sub-display window.

For another example, when video content data stored in a storage medium is reproduced and displayed, the image of the main-video stream including main contents is displayed on the main-display window, and the image of the sub-video stream including auxiliary information associated with the main contents is displayed on the sub-display window. In this case, the display method of the above-mentioned images is set to either one of the PIP mode, the POP mode, and other display modes according to setup information contained in reproduction control information contained in the content data. The reproduction control information includes a reproduction sequence of video streams, window size information, and window location information, etc.

In this manner, the main-video stream and the sub-video stream, which are simultaneously and asynchronously reproduced on a single display, are reproduced at the same time, but they may have different reproduction lengths, such that the reproduction of the sub-video stream may be firstly terminated, or the reproduction of the main-video stream may be firstly terminated.

As can be seen from FIGS. 1B, 2B, and 2C, if one of the main-video stream and the sub-video stream is completely reproduced, and new reproduction control information for changing size- and location-information of display windows of individual video streams is not received, the PIP mode continuously displays the sub-video stream image on a small-sized sub-display window although the reproduction of the main-video stream has been first terminated (See FIGS. 1B and 2C), or the POP mode allows the sub-display window to be empty in an entire screen 202, and at the same time allows the main-display window to be kept in a conventional size smaller than the entire screen 202 although the reproduction of the sub-video stream has been first reproduced (See FIG. 2B).

SUMMARY OF THE INVENTION

Therefore, aspects of the invention have a video playback apparatus and method, where when one of a main-video stream and a sub-video stream is completely reproduced and/or terminated earlier than the other one when the main-video stream and the sub-video stream are simultaneously displayed on an entire screen of a single display via different display windows, a display window of the remaining video stream which is not yet terminated is automatically enlarged up to the size of the entire screen, such that it increases use efficiency of the entire screen, and provides a user with a more convenient screen configuration without receiving a command or key signal from the user.

In accordance with an aspect of the invention, the above and/or other aspects can be achieved by the provision of a video playback apparatus having: a video data processor for simultaneously and asynchronously reproducing a main-video stream and a sub-video stream, and controlling position- and size-information of a corresponding display window; a video output controller, which when one of the main- and sub-video streams reproduced by the video data processor is completely reproduced earlier than a remaining one of the streams, controls the video data processor to enlarge a display window of the remaining video stream to an entire screen size.

In an aspect of the present invention, the apparatus further has: a decoder input detector for determining whether video data of the main-video stream and video data of the sub-video stream are received in the video data processor, and transmitting the determined result to the video output controller, wherein the video output controller determines which one of the main-video stream and the sub-video stream is completely reproduced earlier than the other one according to the determined result of the decoder input detector, and determines a reproduction termination time of the determined video stream.

In an aspect of the present invention, the video output controller determines which one of the main-video stream and the sub-video stream is completely reproduced earlier than the other one on the basis of a comparison of total reproduction time information of the main-video stream and total reproduction time information of the sub-video stream, and determines a reproduction termination time of the determined video stream.

In an aspect of the present invention, the video data processor includes: a decoder for receiving video data of the main-video stream and video data of the sub-video stream, and decoding the received video data; a scaler for controlling size- and location-information of individual main- and sub-display windows formed on an entire screen of a display on the basis of reproduction control information added to the main- and sub-video streams; and a blender for blending individual video data of the main- and sub-video streams whose size and location are determined by the scaler, and forming single video data.

In an aspect of the present invention, the video output controller, when one of the main-video stream and the sub-video stream is completely reproduced earlier than the remaining one, controls the scaler to remove a display window of the reproduction-terminated video stream from the screen of the display.

In an aspect of the present invention, when the main-video stream is completely reproduced earlier than the sub-video stream when the main- and sub-video streams are reproduced according to a Picture-In-Picture (PIP) mode, the video output controller controls the scaler and the blender to enlarge a display window of the sub-video stream to an entire screen size of the display.

In an aspect of the present invention, the video output controller, when the main-video stream and the sub-video stream are reproduced according to a Picture-Out-Picture (POP) mode, controls the scaler and the blender to remove a display window of the main-video stream and enlarge a display window of the sub-video stream to an entire screen size of the display when reproduction of the main-video stream is terminated earlier than that of the sub-video stream,; and controls the scaler and the blender to remove a display window of the sub-video stream and enlarge a display window of the main-video stream to an entire screen size of the display when reproduction of the sub-video stream is terminated earlier than that of the main-video stream.

In accordance with another aspect of the present invention, there is a method for controlling a video playback apparatus having: simultaneously and asynchronously reproducing a main-video stream and a sub-video stream; determining which one of the main-video stream and the sub-video stream is firstly reproduced earlier than a remaining one of the streams; and enlarging a display window of the remaining video stream whose reproduction is not yet terminated to an entire screen size of a display.

In an aspect of the present invention, the method further includes: removing a display window of the reproduction-terminated video stream from the screen of the display when one of the main-video stream and the sub-video stream is completely reproduced earlier than the remaining one.

In an aspect of the present invention, the method further includes; determining whether video data of the main-video stream and video data of the sub-video stream are received in a decoder; and determining which one of the main-video stream and the sub-video stream is completely reproduced earlier than the other one according to the determined result, and determining a reproduction termination time of the determined video stream.

In an aspect of the present invention, the method further includes: receiving total reproduction time information of the main-video stream and total reproduction time information of the sub-video stream; and determining which one of the main-video stream and the sub-video stream is completely reproduced earlier than the other one on the basis of the total reproduction time information, and determining a reproduction termination time of the determined video stream.

In an aspect of the present invention, when the main- and sub-video streams are reproduced according to a Picture-In-Picture (PIP) mode, the method further includes: enlarging a display window of the sub-video stream to an entire screen size of the display when the main-video stream is completely reproduced earlier than the sub-video stream.

In an aspect of the present invention, when the main-video stream and the sub-video stream are reproduced according to a Picture-Out-Picture (POP) mode, the method further includes: removing a display window of the main-video stream, and enlarging a display window of the sub-video stream to the entire screen size of the display when reproduction of the main-video stream is terminated earlier than that of the sub-video stream, and removing a display window of the sub-video stream, and enlarging a display window of the main-video stream to the entire screen size of the display when reproduction of the sub-video stream is terminated earlier than that of the main-video stream.

In accordance with another aspect of the present invention, there is a recording and/or reproducing apparatus, including: a data processor for reproducing at least one first stream and at least one second stream, and controlling corresponding positions and size information of display windows of the first or the second streams; and an output controller for controlling the data processor to enlarge the display window of either the least one first stream or the at least one second stream whichever is not terminated to a selected size for display on a screen of a display.

In accordance with another aspect of the present invention, there is a method for controlling a recording and/or reproducing apparatus, including: reproducing at least one first stream and at least one second stream and controlling corresponding positions and size information of display windows of the first or the second streams; determining whether the at least one first stream or the at least one second stream is terminated; and enlarging the display window of either the least one first stream or the at least one second stream whichever is not terminated to a selected size for display on a screen of a display.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A and 1B show characteristics of a conventional PIP-based display screen;

FIGS. 2A through 2C show characteristics of a conventional POP-based display screen;

FIGS. 5A through 5C show characteristics of a display screen image based on the control method shown in FIG. 4 according to an aspect of the present invention;

FIGS. 7A through 7C show characteristics of a display screen image based on the control method shown in FIG. 6 according to an aspect of the present invention.

DETAILED DESCRIPTION OF THE EMBODIMENTS

Figure 3:
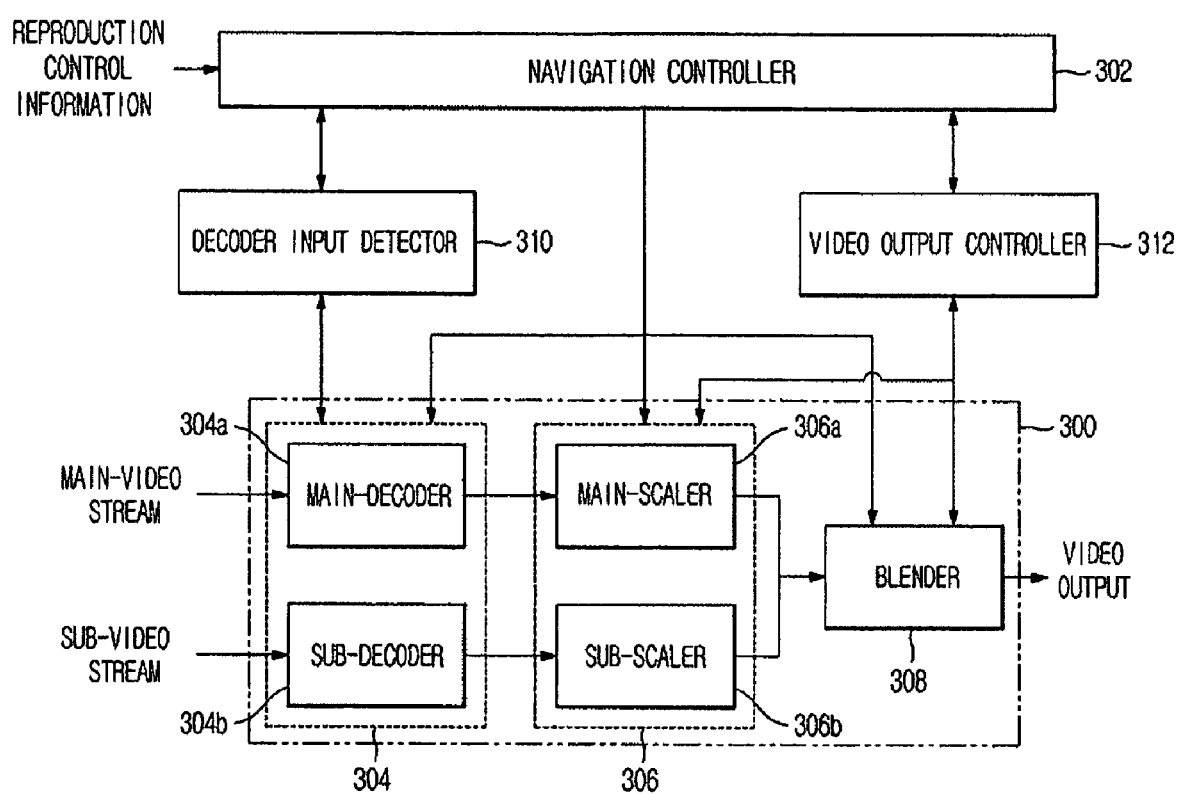
FIG. 3 is a block diagram illustrating a video playback apparatus in accordance with an aspect of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Aspects of the present invention will hereinafter be described with reference to FIGS. 3 through 7C.

FIG. 3 is a block diagram illustrating a video playback apparatus in accordance with an aspect of the present invention. As can be seen from FIG. 3, a navigation controller 302 analyzes reproduction control information indicative of additional information of a video stream, forms a predetermined-sized display window on the screen of a display (not shown), and controls a video data processor 300 to display a reproduced image on the display window. The reproduction control information includes a reproduction sequence of video streams, and size- and location-information of a corresponding display window.

The video data processor 300 reproduces the main-video stream and the sub-video stream, controls the location and size of a corresponding display window, and includes a decoder 304, a scaler 306, and a blender 308. The decoder 304 decodes an encoded video stream, and includes a main decoder 304a for decoding the main-video stream and a sub-decoder 304b for decoding the sub-video stream. While not required in all aspects, the reproduction control information, the main-video stream and/or sub-video stream can be read from one or more storage medium, received in one or more broadcasts, received across a network, or any combination thereof.

Based on the size- and location-information of the display window defined in the reproduction control information, the scaler 306 controls the size and location of a main-display window on which the image of the main-video stream will be displayed on the display, and controls the size and location of a sub-display window on which the image of the sub-video stream will be displayed on the display. The scaler 306 includes a main scaler 306a for controlling a main-display window and a sub-scaler 306b for controlling a sub-display window. The main scaler 306a receives decoded video data from the main decoder 304a. The sub-scaler 306b receives decoded video data from the sub decoder 304b. It is understood that in other aspects of the present invention, the number of main or sub video streams need not be limited to just one, and the decoder 304 and the scaler 306 may contain respective numbers of main or sub decoders (such as 304a, 304b) and/or scalers (such as 306a, 306b). Further, it is understood that the main- and/or sub-video can be other types of displayed information, such as still pictures, text, and other like data.

The blender 308 blends video data of the main-video stream and video data of the sub-video stream. As shown, the main-video stream and the sub-video stream are decoded, and include size- and location-information determined by the scaler 306. An output signal of the blender 308 is equal to a video output signal, and is transmitted to the display (not shown).

A decoder input detector 310 determines whether the main-video stream and the sub-video stream, which are simultaneously and asynchronously reproduced, are applied to the decoder 304. When either one of the main-video stream and the sub-video stream is not applied to the decoder 304 and when this condition is detected, the decoder input detector 310 informs a video output controller 312 of the above-mentioned specific condition via the navigation controller 302. When one of the main-video stream and the sub-video stream is no longer applied to the decoder 304, a video output controller 312 determines that the reproduction of a corresponding video stream is terminated, removes a display window of the corresponding terminated video stream from the screen of the display, and/or controls the scaler 306 and the blender 308 to enlarge the size of the other display window whose reproduction is not yet terminated up to a size as large as the size of the entire screen.

Figure 4:
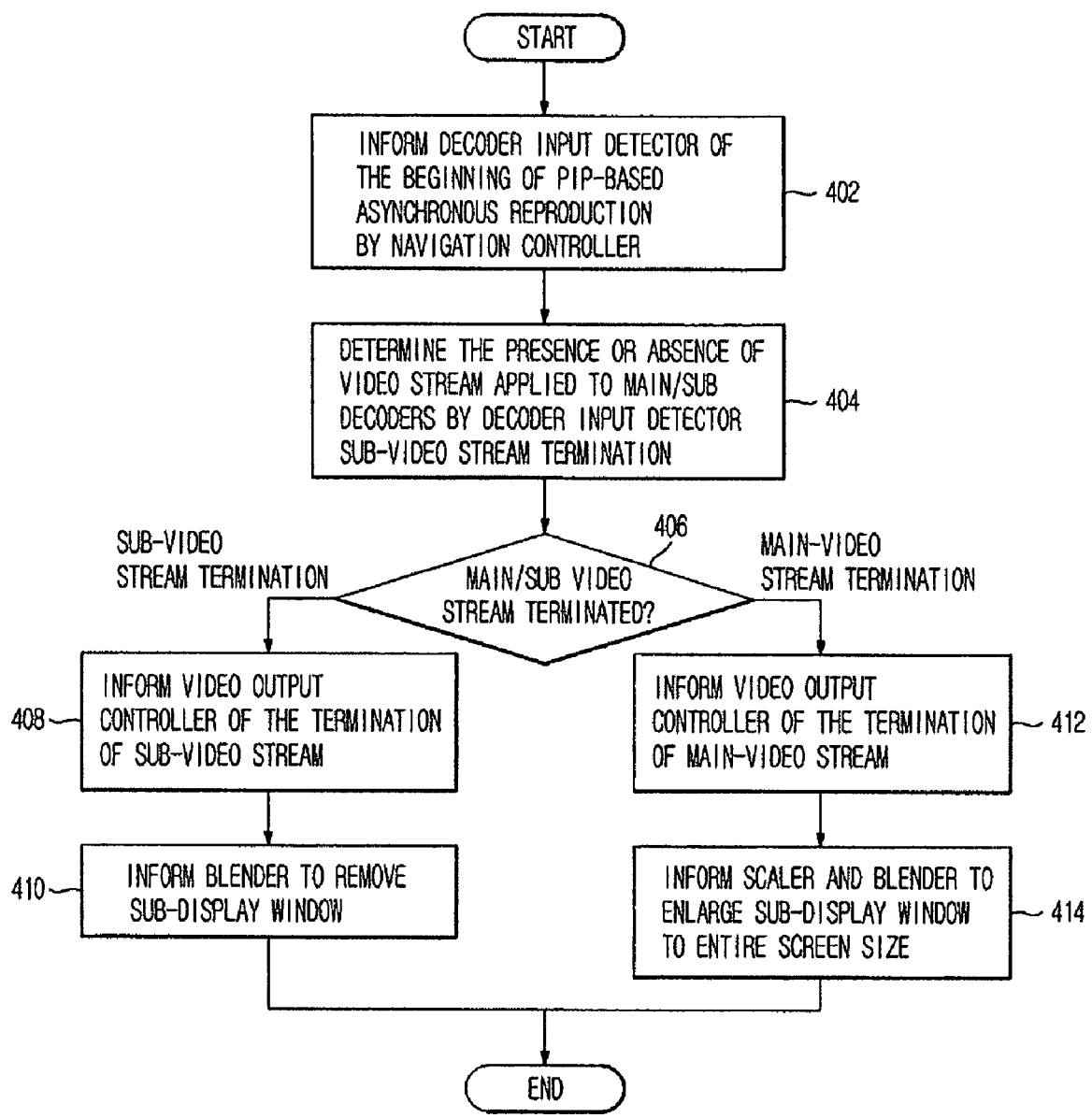
FIG. 4 is a flow chart illustrating a method for controlling the video playback apparatus when two video streams are reproduced according to a PIP mode in accordance with an aspect of the present invention.

FIG. 4 is a flow chart illustrating a method for controlling the video playback apparatus when two video streams are reproduced according to a PIP mode in accordance with an aspect of the present invention. FIGS. 5A through 5C show characteristics of a display screen image based on the control method shown in FIG. 4 according to an aspect of the present invention. The apparatus of FIG. 3 may be used to implement the method of FIG. 4 and the characteristics of FIGS. 5A through 5C, but such use is not required. While not required in all aspects, elements of the method can be implemented as software and/or firmware for use with one or more processors.

As can be seen from FIGS. 4 and 5A through 5C, the navigation controller 302 analyzes reproduction control information, recognizes that the main- and sub-video streams applied to the decoder 304 may be asynchronously reproduced according to the PIP mode, and informs the decoder input detector 310 of a specific message indicating the beginning of asynchronous reproduction of the PIP mode (operation 402). Upon receiving the specific message indicating the beginning of the PIP-mode asynchronous reproduction from the navigation controller 302, the decoder input detector 310 determines whether a main-video stream and a sub-video stream are applied to the main decoder 304a and the sub-decoder 304b, respectively, and determines a presence or an absence of video streams, (operation 404). The reason why the decoder input detector 310 determines whether the main- and sub-video streams are applied to the decoder 304 is to determine whether either one of the main-video stream reproduction and the sub-video stream reproduction is terminated earlier than the other one. Hereinafter, the earlier terminated video stream will also be referred to as the firstly terminated video stream.

When the reproduction of one of the main-video stream and the sub-video stream is completed earlier than the other one, or when one of the streams is terminated earlier than the other one, as shown (operation 406), the decoder input detector 310 determines which reproduction of the corresponding video stream is firstly terminated, and performs the following control process to more efficiently use the entire screen of the display 502. The earlier termination of the video stream may occur when there is a loss of a video stream, such as a signal loss, or where a video clip has been complete, or where a game has been completed (such as in a multiplayer game where one player quits).

In more detail, in a aspect of the present invention, when the input of the sub-video stream is firstly terminated, the decoder input detector 310 informs the video output controller 312 of a specific message indicating the termination of the sub-video stream input (also called "the sub-video stream reproduction") via the navigation controller 302 (operation 408). Upon receiving the message indicating the specific message from the decoder input detector 310, the video output controller 312 transmits a specific command to the blender 308 to have the blender 308 remove the sub-display window 506 from the entire screen 502 of the display (operation 410). Upon receiving the specific command, the blender 308 removes the sub-display window 506 of FIG. 5A from the entire screen 502, such that it is able to use up to the entire screen 502 of the display as the main-display window 504.

However, it is understood that smaller sizes can be preset and/or detected from the picture, such as to prevent a degradation in picture quality.

If the input of the main-video stream is firstly terminated, the decoder input detector 310 transmits a specific message indicating the termination of the main-video stream input to the video output controller 312 via the navigation controller 302 (operation 412). Upon receiving the specific message from the decoder input detector 310, the video output controller 312 commands the scaler 306 and the blender 308 to enlarge the size of the sub-display window 506 contained in the entire screen 502 of the display up to a size as large as the size of the entire screen 502 (operation 414). Therefore, the scaler 306 enlarges the sub-display window 504, such that it can use up to the entire screen 502 of the display as the sub-display window 506 as shown in FIG. 5C. However, it is understood that smaller sizes can be preset and/or detected from the picture, such as to prevent a degradation in picture quality.

Figure 6:
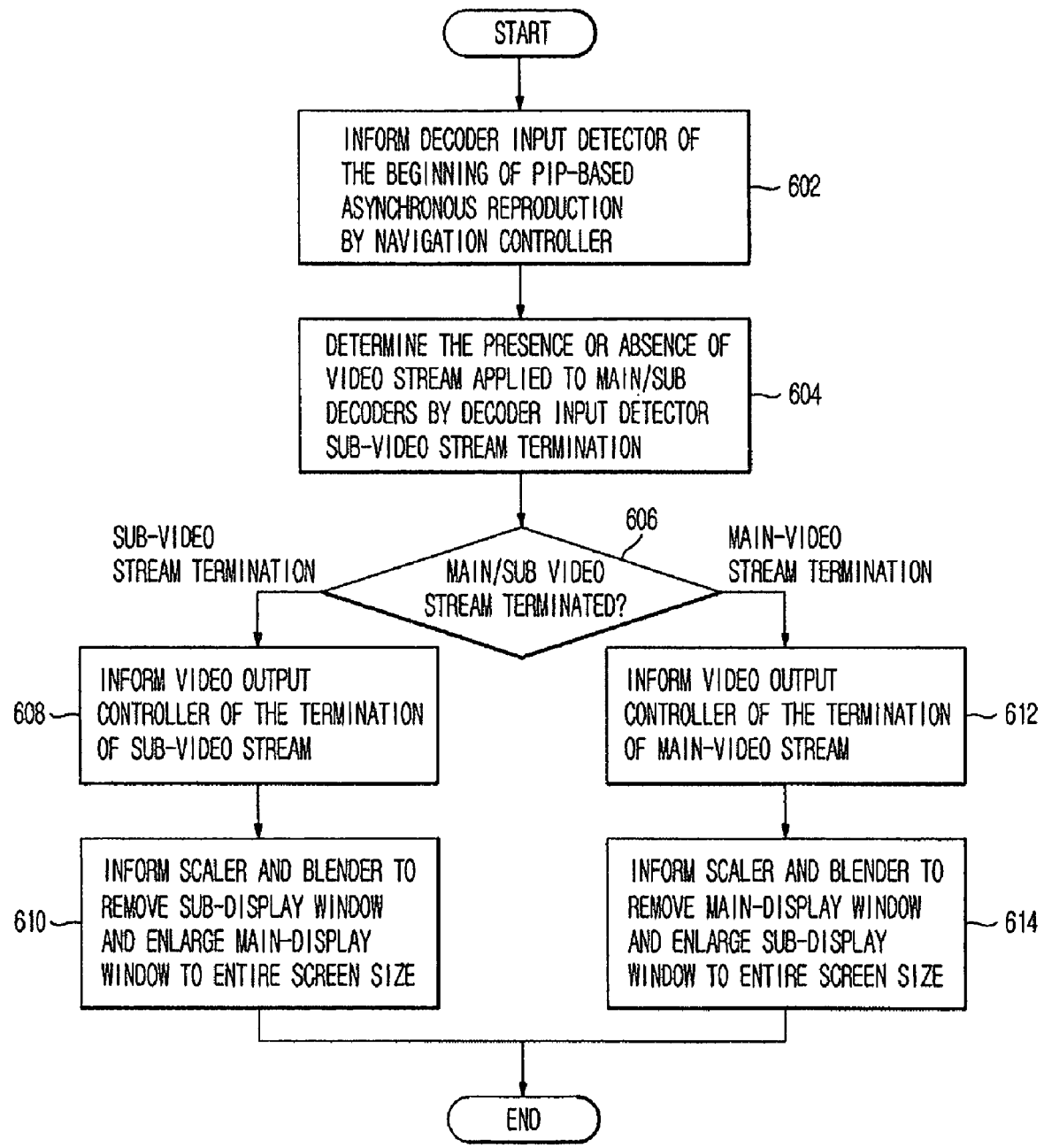
FIG. 6 is a flow chart illustrating a method for controlling the video playback apparatus when two video streams are reproduced according to a POP mode in accordance with another aspect of the present invention.

FIG. 6 is a flow chart illustrating a method for controlling the video playback apparatus when two video streams are asynchronously reproduced according to a POP mode in accordance with another aspect of the present invention. FIGS. 7A through 7C show characteristics of a display screen image based on the control method shown in FIG. 6 according to an aspect of the present invention. The apparatus of FIG. 3 may be used to implement the method of FIG. 6 and the characteristics of FIGS. 7A through 7C, but such use is not required. Additionally, elements of FIG. 6 can be implemented using software and/or firmware for use by one or more processors.

As can be seen from FIGS. 6 and 7A through 7C, the navigation controller 302 analyzes reproduction control information, recognizes that the main- and sub-video streams applied to the decoder 304 may be asynchronously reproduced according to the POP mode, and informs the decoder input detector 310 of a specific message indicating the beginning of asynchronous reproduction of the POP mode (operation 602). Upon receiving the specific message indicating the beginning of the POP-mode asynchronous reproduction from the navigation controller 302, the decoder input detector 310 determines whether a main-video stream and a sub-video stream are applied to the main decoder 304a and the sub-decoder 304b, respectively, and determines a presence of an absence of video streams (operation 604). The reason why the decoder input detector 310 determines whether the main- and sub-video streams are applied to the decoder 304 is to determine whether either one of the main-video stream reproduction and the sub-video stream reproduction is terminated earlier than the other one.

When reproduction of one of the main-video stream and the sub-video stream is completed earlier than the other one, or when one of them is terminated earlier than the other one, as shown (operation 606), the decoder input detector 310 determines which reproduction of the corresponding video stream is firstly terminated, and performs the following control process to more efficiently use the entire screen of the display 702. The earlier termination of the video stream may occur when there is a loss of a video stream, such as a signal loss.

In more detail, in an aspect of the present invention, when the input of the sub-video stream is firstly terminated, the decoder input detector 310 informs the video output controller 312 of a specific message indicating the termination of the sub-video stream input (also called "the sub-video stream reproduction") via the navigation controller 302 (operation 608). Upon receiving the message indicating the specific message from the decoder input detector 310, the video output controller 312 transmits a specific command to the scaler 306 and the blender 308 to have the scaler 306 and the blender 308 remove the sub-display window 706 from the entire screen 702 of the display and enlarge the size of the main-display window 704 up to the size of the entire screen 702 (operation 610). Upon receiving the specific command, the blender 308 removes the sub-video display 706 of FIG. 7A from the entire screen 702, the scaler 306 enlarges the main-display window 704 shown in FIG. 7A up to the size of the entire screen 702, such that up to the entire screen 702 of the display can be used as the main-display window 704. However, it is understood that smaller sizes can be preset and/or detected from the picture, such as to prevent a degradation in picture quality.

If the input of the main-video stream is firstly terminated, the decoder input detector 310 transmits a specific message indicating the termination of the main-video stream input to the video output controller 312 via the navigation controller 302 (operation 612). Upon receiving the specific message from the decoder input detector 310, the video output controller 312 commands the scaler 306 and the blender 308 to remove the main-display window 704 and enlarge the sub-display window 704 up to a predetermined size as large as the entire screen 702, (operation 614). Therefore, the scaler 306 enlarges the sub-display window 704, such that up to the entire screen 702 of the display can be used as the sub-display window 706 as shown in FIG. 7C. However, it is understood that smaller sizes can be preset and/or detected from the picture, such as to prevent a degradation in picture quality.

In accordance with another aspect of the present invention, if total reproduction time information of the main-video stream and total reproduction time information of the sub-video stream are contained in the reproduction control information applied to the navigation controller 302 so that the reproduction control information contains not only a video stream whose reproduction is terminated earlier than that of the other video stream, but also a termination time of the video stream is detected, then the size of the display window can be also controlled to enlarge the display window of the later terminating video stream, such as is shown in FIGS. 4 through 7C. In an aspect of the present invention, the determination of which one of the main-video stream and the sub-video stream is completely reproduced earlier than the other one may be on the basis of total reproduction time information of the main-video stream and total reproduction time information of the sub-video stream. The determination may be used to determine a reproduction termination time of the determined video stream. In an aspect of the present invention, the determination may be on the basis of the comparison between the total reproduction time information of the main-video stream and the total reproduction time information of the sub-video stream.

In other words, in the case of using total reproduction time information of the main-video stream and total reproduction time information of the sub-video stream, the decoder input detector 310 may be omitted. The reproduction time information may also be a time of day when each of the video streams is to terminate, and/or a user selected time interval to indicate the duration of the reproduction before each of the video streams is terminated.

In addition, the above aspects of the present invention for simultaneously and asynchronously reproducing two video streams are not limited to either reproduction of DVD contents and/or TV broadcast reception, and includes a variety of applications, for example, a method for reproducing two or more different video images in real time using an Internet streaming service, and a method for controlling a computer equipped with a TV reception function to receive/reproduce TV broadcast data simultaneously reproducing other video data via the Internet streaming service in real time, etc., such that the main- and sub-video streams may be any combination of data or content. Additionally, the video data may include a variety of different video formats, and other media can contain one or more video streams, such as hard drives, magnetic storage media, and optical media, in addition to or instead of DVDs.

As is apparent from the above description, if one of main- and sub-video streams asynchronously reproduced is completely reproduced earlier than the other one, the video playback apparatus and method according to the present invention enlarges a display window of the remaining video stream to the size of the entire screen, and displays the enlarged display window, such that it increases use efficiency of the entire screen and provides a user with a more convenient screen configuration without receiving a command or key signal from the user. Additionally, although described in terms of a video playback apparatus, it is understood that aspects of the invention can include an apparatus that further records.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A video playback apparatus comprising:
   a video data processor for simultaneously and asynchronously reproducing a main-video stream and a sub-video stream, and controlling position- and size- information of a corresponding display window; and
   a video output controller, which when one of the main- and sub-video streams reproduced by the video data processor is completely reproduced earlier than a remaining one of the streams, controls the video data processor to enlarge a display window of the remaining video stream to an entire screen size,
   wherein the video output controller determines which one of the main-video stream and the sub-video stream is completely reproduced earlier than the other one on the basis of a comparison of total reproduction time information of the main-video stream and total reproduction time information of the sub-video stream, and determines a reproduction termination time of the determined video stream.

2. The apparatus according to claim 1, wherein the video data processor includes:
   a decoder for receiving video data of the main-video stream and video data of the sub-video stream, and decoding then received video data;
   a scaler for controlling size- and location- information of individual main- and sub-display windows formed on an entire screen of a display on the basis of reproduction control information added to the main- and sub- video streams; and
   a blender for blending individual video data of the main- and sub- video streams whose size and location are determined by the scaler, and forming single video data.

3. The apparatus according to claim 2, wherein the video output controller, when one of the main-video stream and the sub-video stream is completely reproduced earlier than the remaining one, controls the scaler to remove a display window of the reproduction-terminated video stream from the screen of the display.

4. The apparatus according to claim 2, wherein the video output controller, when the main-video stream is completely reproduced earlier than the sub-video stream when the main- and sub- video streams are reproduced according to a Picture-In-Picture (PIP) mode, controls the scaler and the blender to enlarge a display window of the sub-video stream to an entire screen size of the display.

5. The apparatus according to claim 2, wherein the video output controller when the main-video stream and the sub-video stream are reproduced according to a Picture-Out-Picture (POP) mode,
   when reproduction of the main-video stream is terminated earlier than that of the sub-video stream, controls the scaler and the blender to remove a display window of the main-video stream and enlarge a display window of the sub-video stream to an entire screen size of the display.

6. A method for controlling a video playback apparatus comprising:
   simultaneously and asynchronously reproducing a main-video stream and a sub-video stream;
   determining which one of the main-video stream and the sub-video stream is firstly reproduced earlier than a remaining one of the streams;
   enlarging a display window of the remaining video stream whose reproduction is not yet terminated to an entire screen size of a display;
   receiving total reproduction time information of the main-video stream and total reproduction time information of the sub-video stream; and
   determining which one of the main-video stream and sub-video stream is completely reproduced earlier than the other one on the basis of the total reproduction time information, and determining a reproduction termination time of the determined video stream.

7. The method according to claim 6, further comprising:
   removing a display window of the reproduction-terminated video stream from the screen of the display when one of the main-video stream and the sub-video stream is completely reproduced earlier than the remaining one.

8. The method according to claim 6 applicable to when the main-and sub-video streams are reproduced according to a Picture-In-Picture (PIP) mode, further comprising: enlarging a display window of the sub-video stream to an entire screen size of the display when the main-video stream is completely reproduced earlier than the sub-video stream.

9. The method according to claim 6 applicable to when the main-video stream and the sub-video stream are reproduced according to a Picture-Out-Picture (POP) mode, further comprising:
   removing a display window of the main-video stream, and enlarging a display window of the sub-video stream to the entire screen size of the display when reproduction of the main-video stream is terminated earlier than that of the sub-video stream.

10. A recording and/or reproducing apparatus, comprising:
    a data processor for reproducing at least one main video stream and at least one-sub-video stream, and controlling corresponding positions and size information of display windows of the main-video or the sub-video streams; and
    an output controller for controlling the data processor to enlarge the display window of whichever one of the at least one main video stream and the at least one sub-video stream that is not terminated to a selected size for display on a screen of a display,
    wherein the video output controller determines which one of the main-video stream and the sub-video stream is completely reproduced earlier than the other one on the basis of a comparison of total reproduction time information of the main-video stream and total reproduction time information of the sub-video stream, and determines a reproduction termination time of the determined video stream.

11. The apparatus according to claim 10, wherein the data processor includes:
a decoder for receiving first data of the at least one main video stream and second data of the at least one sub-video stream, and decoding the received first and second data;
a scaler for controlling size and location information of the corresponding display window of the at least one main video and the at least one sub-video stream formed on a display on the basis of a reproduction control information added to the at least one main video stream and the at least one sub-video stream; and
a blender for blending individual first and second data of the at least one main video stream and the at least one sub-video stream whose size and location are determined by the scaler, and forming a single data to be displayed.

12. The apparatus of claim 11, wherein the output controller controls the scaler to remove the display window of the terminated one of the at least one main video or the at least one sub-video stream from the screen of the display.

13. The apparatus of claim 10, wherein the selected size is a full screen size of the display.

14. The apparatus of claim 10, wherein either the at least one main video stream or the at least one sub-video stream is terminated when the corresponding stream is lost.

15. The apparatus of claim 10, wherein either the at least one main video stream or the at least one sub-video stream is terminated when completely reproduced.

16. The apparatus of claim 10, wherein either the at least one main video stream or the at least one sub-video stream is terminated after a selected time.

17. The apparatus of claim 16, wherein the selected time is at least one of a user set time period and a time of day.

18. A method for controlling a recording and/or reproducing apparatus, comprising:
reproducing at least one main video stream and at least one sub-video stream and controlling corresponding positions and size information of display windows of the main video or the sub-video streams;
determining which one of the at least one main video stream and the at least one sub-video stream is terminated and ;
enlarging the display window of the remaining video stream of the at least one main video stream and the at least one sub-video stream that is not terminated to a selected size for display on a screen of a display
receiving total reproduction time information of the main-video stream and total reproduction time information of the sub-video stream; and
determining which one of the main-video stream and sub-video stream is completely reproduced earlier than the other one on the basis of the total reproduction time information, and determining a reproduction termination time of determined video stream.

19. The method according to claim 18, further comprising:
receiving first data of the at least one main video stream and second data of the at least one sub-video stream, and decoding the received first and second data;
controlling size and location information of the corresponding display window of the at least one main video and the at least one sub-video stream formed on the display on the basis of a reproduction control information added to the at least one main video stream and the at least one sub-video stream; and
blending individual first and second data of the at least one main video stream and the at least one sub-video stream whose size and location are determined, and forming a single data to be displayed.

20. The method according to claim 18, further comprising removing the display window of the terminated stream from the screen of the display.

21. The method according to claim 18, wherein the selected size is a full screen size of the display.

22. The method according to claim 18, further comprising eliminating the display window of the terminated stream.

23. The method according to claim 18, wherein either the at least one main video stream or the at least one sub-video stream is each terminated when the corresponding stream is lost.

24. The method according to claim 18, wherein either the at least one main video stream or the at least one sub-video stream is each terminated when completely reproduced.

25. The method according to claim 18, wherein either the at least one main video stream or the at least one sub-video stream is terminated after a selected time.

26. The method according to claim 24, wherein the selected time is at least one of a user set time period and a time of day.

27. A video playback apparatus comprising:
a decoder input detector that receives a main-video stream and a sub-video stream each being simultaneously and asynchronously reproduced and that detects when at least one of the main-video stream and sub-video stream are no-longer received and that outputs at least one termination signal indicating the at least one main-video stream and a sub-video stream is no longer received by the decoder input detector; and
a video output controller in communication with the decoder input detector that controls a video data processor to enlarge a display window of the remaining video stream to an entire screen size in response to the termination signal output by the decoder input detector,
wherein the video output controller determines which of the at least one main-video stream and the sub-video stream is completely reproduced earlier than the other one on the basis of a comparison of total reproduction time information of the main-video stream and total reproduction time information of the sub-video stream, and determines a reproduction termination time of the determined video stream.

* * * * *